United States Patent
Hall

(10) Patent No.: US 9,637,188 B2
(45) Date of Patent: May 2, 2017

(54) CRAWLER WEB

(71) Applicant: Hans Hall GmbH, Weingarten (DE)

(72) Inventor: Hans Hall, Weingarten (DE)

(73) Assignee: Hans Hall GmbH, Weingarten (DE)

( * ) Notice: Subject to any disclaimer, the term of this patent is extended or adjusted under 35 U.S.C. 154(b) by 0 days.

(21) Appl. No.: 14/703,011

(22) Filed: May 4, 2015

(65) Prior Publication Data

US 2015/0321713 A1    Nov. 12, 2015

(30) Foreign Application Priority Data

May 12, 2014   (DE) .................... 20 2014 102 210 U

(51) Int. Cl.
  *B62D 55/28*   (2006.01)
  *B62D 55/20*   (2006.01)

(52) U.S. Cl.
  CPC ........... *B62D 55/28* (2013.01); *B62D 55/202* (2013.01); *B62D 55/286* (2013.01)

(58) Field of Classification Search
  CPC ...... B62D 55/18; B62D 55/20; B62D 55/202; B62D 55/24; B62D 55/244; B62D 55/253; B62D 55/26; B62D 55/27; B62D 55/28; B62D 55/286
  USPC ................ 305/187, 188, 189, 190, 191, 192
  See application file for complete search history.

(56) References Cited

U.S. PATENT DOCUMENTS

| | | | |
|---|---|---|---|
| 3,463,562 A | 8/1969 | Svensson | |
| 3,703,321 A * | 11/1972 | Schoonover | C09B 5/00 305/166 |
| 3,883,190 A * | 5/1975 | Kilbane, Jr. | B62D 55/27 305/180 |
| 3,944,006 A * | 3/1976 | Lassanske | B62D 55/24 180/9.62 |
| 5,713,645 A | 2/1998 | Thompson et al. | |
| 5,921,642 A * | 7/1999 | Tschida | B62D 55/286 305/162 |
| 6,264,294 B1 * | 7/2001 | Musselman | B62D 55/26 305/178 |

(Continued)

FOREIGN PATENT DOCUMENTS

| | | |
|---|---|---|
| AT | 384 792 B | 1/1988 |
| AT | 005 902 U1 | 1/2003 |

(Continued)

OTHER PUBLICATIONS

European Search Report, European Application No. 15165873.9, dated Sep. 10, 2015 (8 pages).

(Continued)

*Primary Examiner* — John Walters
(74) *Attorney, Agent, or Firm* — Burr & Brown, PLLC

(57) ABSTRACT

A crawler web for a crawler chain of a crawler vehicle, in particular a snow vehicle, is proposed, wherein the crawler web comprises a base rail which is attachable releasably to the crawler chain, a track bracket which is provided for guiding the crawler chain on a chassis of the crawler vehicle, and a tread element which is provided for arrangement on a ground contact side of the crawler chain and for engagement in an underlying surface. According to the invention, the track bracket and the tread element are formed integrally, wherein the tread element is extended over a large part of a length in the longitudinal direction of the base rail.

17 Claims, 6 Drawing Sheets

(56) References Cited

U.S. PATENT DOCUMENTS

| | | | |
|---|---|---|---|
| 6,296,330 B1 * | 10/2001 | Hall | B62D 55/27 305/161 |
| 6,540,310 B1 * | 4/2003 | Cartwright | B62D 55/28 305/160 |
| 2003/0025392 A1 | 2/2003 | Morin et al. | |

FOREIGN PATENT DOCUMENTS

| | | |
|---|---|---|
| DE | 103 20 523 A1 | 11/2004 |
| WO | 2011/127554 A1 | 10/2011 |

OTHER PUBLICATIONS

German Search Report (Application No. 20 2014 102 210.4) dated Feb. 4, 2015.

\* cited by examiner

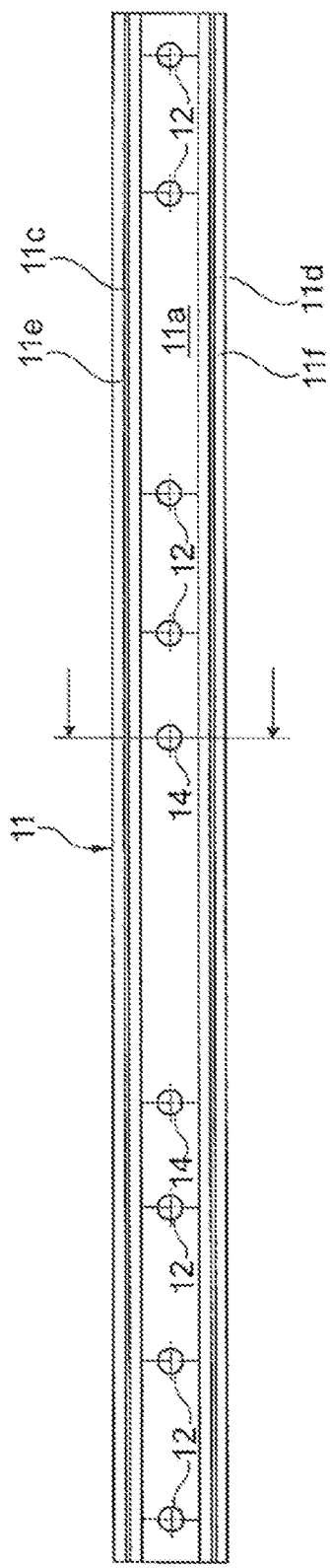
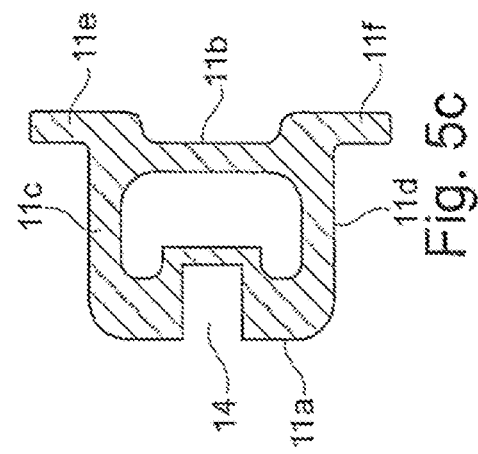
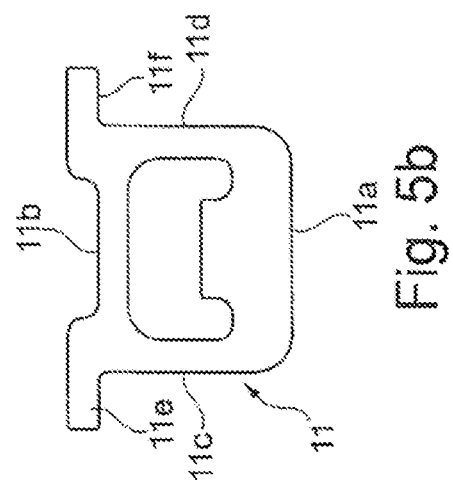

CRAWLER WEB

This application claims the benefit under 35 USC §119 (a)-(d) of German Application No. 20 2014 102 210.4 filed May 12, 2014, the entirety of which is incorporated herein by reference.

FIELD OF THE INVENTION

The invention relates to a crawler web for a crawler chain of a crawler vehicle.

BACKGROUND OF THE INVENTION

A wide variety of embodiments of crawler webs for crawler vehicles are known from the prior art. The crawler webs are provided in order to be connected to one or preferably more track belts, wherein the crawler webs are arranged transversely, in particular perpendicularly, to the running direction of the track belts. The running direction of the track belts here is generally oriented parallel to rectilinear driving directions of a crawler vehicle. Comparatively long crawler webs are preferably used here in order to distribute the load of a crawler vehicle over part, in particular over a large part, of a track width of a crawler chain of a crawler vehicle.

For example, in the case of crawler vehicles for winter use, such as, for example, piste preparation vehicles, the crawler webs on a crawler chain are frequently arranged at a comparatively small distance one after another along one or more track belts in the running direction thereof and are preferably provided here as chain webs, in particular engagement webs, of the crawler chain, in which a drive wheel of the crawler vehicle can engage.

In order to ensure secure guidance of the crawler chain on a chassis of the moving crawler vehicle, a crawler chain can have, as is known, guide elements on a side facing the chassis, i.e. on a chassis side of the crawler chain, which guide elements are attached, for example, to the crawler web or to a track belt. A guide track on the chassis side of the crawler chain is generally predetermined with the guide elements, wherein the guide elements keep chassis parts, such as, for example, a drive wheel, for example a track roller and, for example, a runner in a region of the guide track in engagement with the crawler chain and allow the chassis parts to move along in the running direction of the crawler chain on the chassis side thereof. The guide elements of the crawler chain ensure that transverse forces during the driving mode that occur, for example, during cornering or during turning maneuvers can be transmitted by the chassis to an underlying surface and, in the process, the crawler chain reliably maintains a designated arrangement with respect to the chassis. For example, guide elements are known in the form of a track bracket which can be attached, for example, to the crawler web, wherein horn- or hump-shaped projections protrude toward the chassis at, for example, opposite ends of a central piece. The crawler webs are generally arranged on the crawler chain in such a manner that the track brackets follow one another in the running direction and, between the projections, form, for example, a continuous track channel in which, for example, a drive wheel and, for example, a track roller of the chassis can engage.

On the side facing away from the chassis, i.e. on the ground contact side of the crawler chain, crawler webs are customarily equipped with tread means and optionally engagement means in order to ensure effective traction by means of extensive support and optionally also by means of engaging projections on an underlying surface being traveled over. The ground adhesion of the crawler chain and in particular of the crawler webs serves, in addition to transmitting acceleration and braking forces, also for transmitting forces which are directed sideways and which occur, for example, during changes in direction during cornering or, for example, when traveling transversely with respect to the direction of inclination of a slope.

SUMMARY OF THE INVENTION

The present invention is based on the object of providing a crawler web which is improved in respect of wear and maintenance.

The invention is based on a crawler web for a crawler chain of a crawler vehicle, in particular a snow vehicle, wherein the crawler web comprises a base rail which is attachable releasably to the crawler chain, a track bracket which is provided for guiding the crawler chain on a chassis of the crawler vehicle, and a tread element which is provided for arrangement on a ground contact side of the crawler chain and for engagement in an underlying surface. The essence of the present invention consists in that the track bracket and the tread element are formed integrally, wherein the tread element is extended over a large part of a length in the longitudinal direction of the base rail. As a result, transverse forces which occur when traveling, for example, because of a change in direction during cornering or, for example, when traveling transversely with respect to the direction of inclination of a slope, can advantageously be directly transmitted from the track bracket to the tread element, as a result of which, for example, wear of fastening means for a tread element and a track bracket which, for example, are attached separately to the base rail can be avoided.

The demands imposed on a track bracket which can provide a chassis with reliable temporary support differ depending on the underlying surface, with which a tread element is preferably coordinated. A crawler web according to the present invention affords the advantage that, by means of an integral design of track bracket and tread element, it is ensured that a track bracket is mounted at the same time as the tread element, the track bracket being coordinated, for example, with the same transverse forces as the tread element, which are characteristic of a designated use. The base rail here can be coordinated for a uniform distribution of a weight transmitted to the track bracket and of driving forces during traveling, accelerating and braking. By means of an at least partial division of the force transmissions perpendicularly and along the running direction to the track bracket connected integrally with the tread element, and to the base rail, the corresponding parts can be comparatively better coordinated with the loadings associated therewith.

By means of the integral design of tread element and track bracket, the tread element and track bracket can be combinable as one unit with various embodiments of a base rail, for example, in the form of a solid profile rail or, for example, in the form of a hollow profile rail, for the construction of a crawler web. As a result, a crawler web can be assembled differently, for example, as regards weight and, for example, rigidity.

In a preferred refinement of the present invention, the track bracket and the tread element are cast onto the base rail. The track bracket and the tread element can be cast here onto the base rail, for example, by vulcanization from a rubber mixture. This makes it possible to achieve a comparatively strong material connection of a, for example, metallic base rail to the material of the track bracket and of the tread element, ensuring an advantageously high degree of strength and durability of the crawler web. As a result, wear between the tread element or the track bracket and the base rail can advantageously be avoided. Furthermore, when the tread element and the track bracket are cast on, a, for example, metallic base rail can be partially or completely enclosed by a, for example, plastics layer in order to achieve increased protection against corrosion.

For relatively good ground adhesion and in order to reduce driving noises, it is preferred that the track bracket and the tread element are produced from an elastically flexible material, in particular, a rubbery material. A rubber-elastic material also provides relatively high ground adhesion on comparatively smooth surfaces, for example, stone or concrete surfaces which have been worn smooth.

Further materials, such as, for example, plastics or else silicone-based elastic materials can be used individually or in combination with one another for the track bracket and the tread element. For example, by means of a stepwise production process, the track bracket can be cast on consisting of a different material than the tread element. With a tread element composed of an elastic, flexible material, in particular fortified travel ways can be protected. The track bracket composed of an elastic, flexible material permits damping of driving noises of the chassis during locomotion.

A preferred embodiment of the invention consists in that at least two tread profile portions which protrude outwards, in particular downwards, are formed on the tread element and are arranged in an angled manner with respect to each other and with respect to a longitudinal axis of the tread element, in particular of the base rail. Such tread profile portions can absorb forces parallel to the driving direction and also transversely, in particular perpendicularly, to the driving direction, as a result of which improved track guidance can be achieved, in particular during cornering of a crawler vehicle. In particular, the at least two tread profile portions can be arranged symmetrically with respect to each other with respect to the running direction of the crawler chain in order, for example, to avoid a lateral action of force on one side.

Furthermore, it is preferred that the tread element is delimited on the ground contact side by an at least enveloping profile line which has a downwardly precurved profile along a longitudinal axis of the tread element. The tread element here can have a greater profile height in a central portion, for example below the track bracket, than, for example, in the region of end portions of the tread element, in particular of the base rail. The crawler web according to the present invention can thereby have greater penetration depth and ground adhesion in a region of increased loading than, for example, in an outer region of the crawler web, as a result of which a crawler vehicle can negotiate comparatively small turning radii. A crawler chain with crawler webs according to the invention thereby provides improved maneuverability for a crawler vehicle.

A further preferred embodiment of the present invention consists in that a penetrating element, in particular an ice spike, is attached to the crawler web. Safe locomotion on ice or on a similarly hard, smooth underlying surface is thereby possible.

Preferably, a plurality of pointy projections which are arranged separately next to one another and protrude in a common direction and in particular at substantially the same height are formed at one end of the penetrating element for ground contact. If the projections protrude in particular from a common base surface, the penetration depth of the penetrating element and the ecological effect thereof, for example, in respect of ground erodability can thereby be limited.

An attachment sleeve which is provided for attaching the penetrating element, in particular the ice spike, to the tread element can be cast into the tread element. The sleeve is preferably arranged recessed in the tread element, as a result of which, for example, elastically flexible material at least partially surrounds an attached penetrating element in order, for example, to limit a penetration depth. In particular, it is preferred here that the attachment sleeve is arranged in the tread element in such a manner that the attachment sleeve is spaced apart from the base rail by elastically flexible material of the tread element. As a result, the penetrating element is cushioned by the elastically flexible material of the tread element between the sleeve and the base rail in order, for example, to reduce abrasion of the penetrating element, in particular of the projections.

The attachment sleeve can have a thread, in particular an internal thread, for example, on a downwardly directed opening, with which a penetrating element can, for example, be screwed to the tread element. For attachment of the penetrating element, the attachment sleeve can also have a groove of a bayonet catch on an opening directed toward the ground contact side.

A further preferred embodiment of the invention consists in that at least one reinforcing element by means of which the track bracket is at least partially stiffened is formed on the base rail. For example, spring steel bolts which can be recast with the material of the track bracket in order to form horn- or hump-shaped elevations as guide elements can protrude toward the chassis on the base rail in the region of the track bracket.

The attachment sleeve is preferably produced from a metal, in particular from steel. Furthermore, the base rail can be produced from a metal, in particular from a steel. In addition, the base rail can be produced from, for example, a light metal or, for example, from carbon or, for example, from a combination of different materials.

The base rail preferably has an attachment device for an elastic crawler belt. For example, a bore with an internal thread for the screwing on of a crawler belt can be formed on the base rail, wherein preferably a plurality of such bores are provided for a crawler belt. For a crawler chain with a plurality of crawler belts, the base rail is preferably equipped with a plurality of placing devices for crawler belts.

BRIEF DESCRIPTION OF THE DRAWINGS

An exemplary embodiment of the present invention is described and explained below with the aid of the drawings.

FIG. 5a shows a schematic view of a chassis side of a web rail;

FIG. 5b shows a schematic view of an end side of the web rail;

FIG. 5c shows a schematic view of a cross section of the web rail in the region of a blind hole bore for a clamping pin.

DETAILED DESCRIPTION OF THE INVENTION

Figure 1:
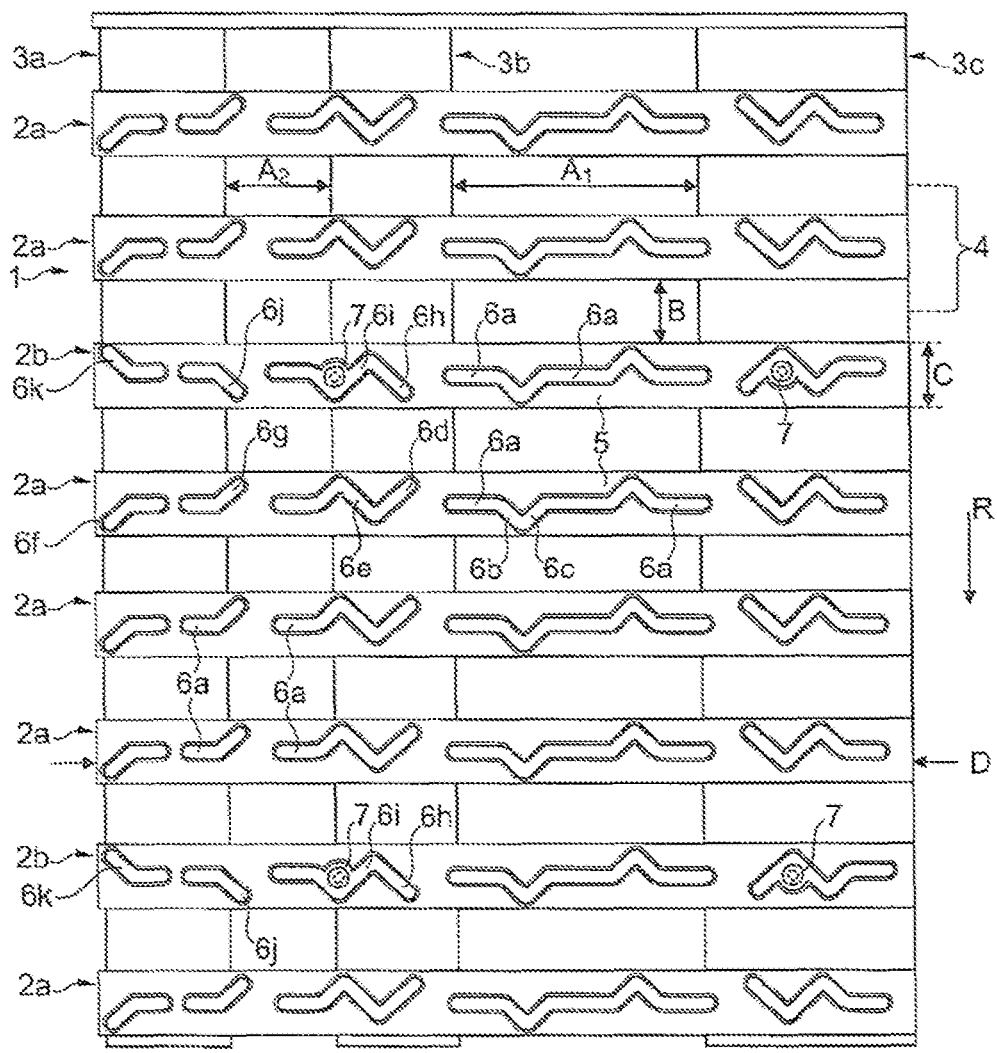
FIG. 1 shows a schematic view of a ground contact side of a crawler chain with crawler webs according to the invention.

FIG. 1 shows a crawler chain 1 to which a first exemplary embodiment 2a and a second exemplary embodiment 2b for crawler webs according to the invention are attached. For example, in each case three crawler webs 2a can be arranged here one behind another in a rolling direction R between every two crawler webs 2b.

The crawler webs 2a and 2b have an identical width C and are formed with an identical length D perpendicularly to the running direction R. The webs are connected to one another here via flexible belts 3a, 3b and 3c. The belts 3a, 3b and 3c can be screwed here onto the crawler webs 2a, 2b. For a comparatively light and wear-free construction, the elastic belts 3a, 3b and 3c are arranged at distances from one another, wherein, for example, the belts 3a and 3b are placed at a distance $A_2$ and the belts 3b and 3c at a distance $A_1$. The distance $A_1$ between the belts 3b and 3c is coordinated here with a chassis (not shown), in particular a drive wheel (not shown) of a crawler vehicle, which drive wheel can engage with a toothing (not shown) between the crawler webs 2a and 2b in order to drive the crawler chain 1.

The distance B by which the crawler webs 2a and 2b are separated from each other in the running direction and are attached one after the other is likewise coordinated with the toothing of a drive wheel (not shown).

On the ground contact side, the crawler webs 2a, 2b are preferably completely covered by the material of the tread element. Tread cleats 6a-6k in the form of web-shaped projections which protrude perpendicularly from the ground contact side and which are provided for additional support of the tread element during the engagement in an underlying surface being traveled over are formed on the tread element 5. A plurality of tread cleats 6a can run parallel to the longitudinal direction of the crawler webs and are used to reinforce traction for an acceleration and a braking of a crawler vehicle (not shown).

In order to provide a crawler vehicle with lateral support, in particular during cornering, a plurality of tread cleats 6b, 6c, 6e, 6d, 6f, 6g, 6i, 6j and 6k are oriented at an angle of, for example, 45° with respect to a longitudinal axis of a crawler web in different directions, i.e. in and counter to a running direction R. The profile cleats 6b to 6k which are arranged in an angled manner provide increased resistance transversely with respect to the driving direction of a crawler vehicle, as a result of which increased driving safety is advantageously achievable with the crawler webs 2a, 2b according to the invention. For improved maneuverability, the tread cleats 6a-6k can protrude at a greater height from the tread element 5 in a central portion of the crawler web 2a, 2b, for example in the region of the track bracket 10, than at outer end regions with respect to a longitudinal axis of the crawler web 2a, 2b. By means of a correspondingly reduced height of the tread cleats 6a-6k at the outer end regions of the crawler web along the longitudinal axis, correspondingly reduced traction forces arise at the end portions during cornering and turning maneuvers of a crawler vehicle.

The crawler webs 2a and 2b differ from one another, for example, in the arrangement of the cleats 6a to 6k. A further difference between the crawler webs 2a and 2b consists in that ice spikes 7 are additionally insertable on the crawler webs 2b, with which ice spikes 7 locomotion of a crawler vehicle (not shown) on a hard and smooth underlying surface, for example ice, is improved or is only possible at all.

Figure 2:
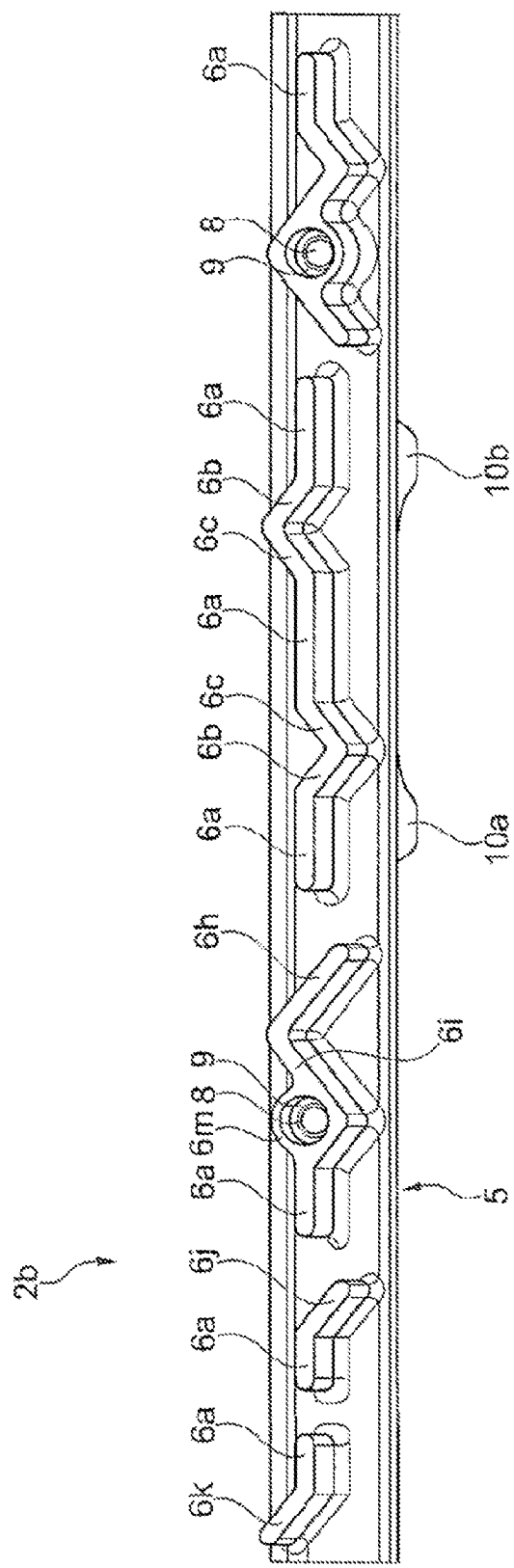
FIG. 2 shows a schematic perspective view of a ground contact side of a crawler web according to the invention.
Figure 3:
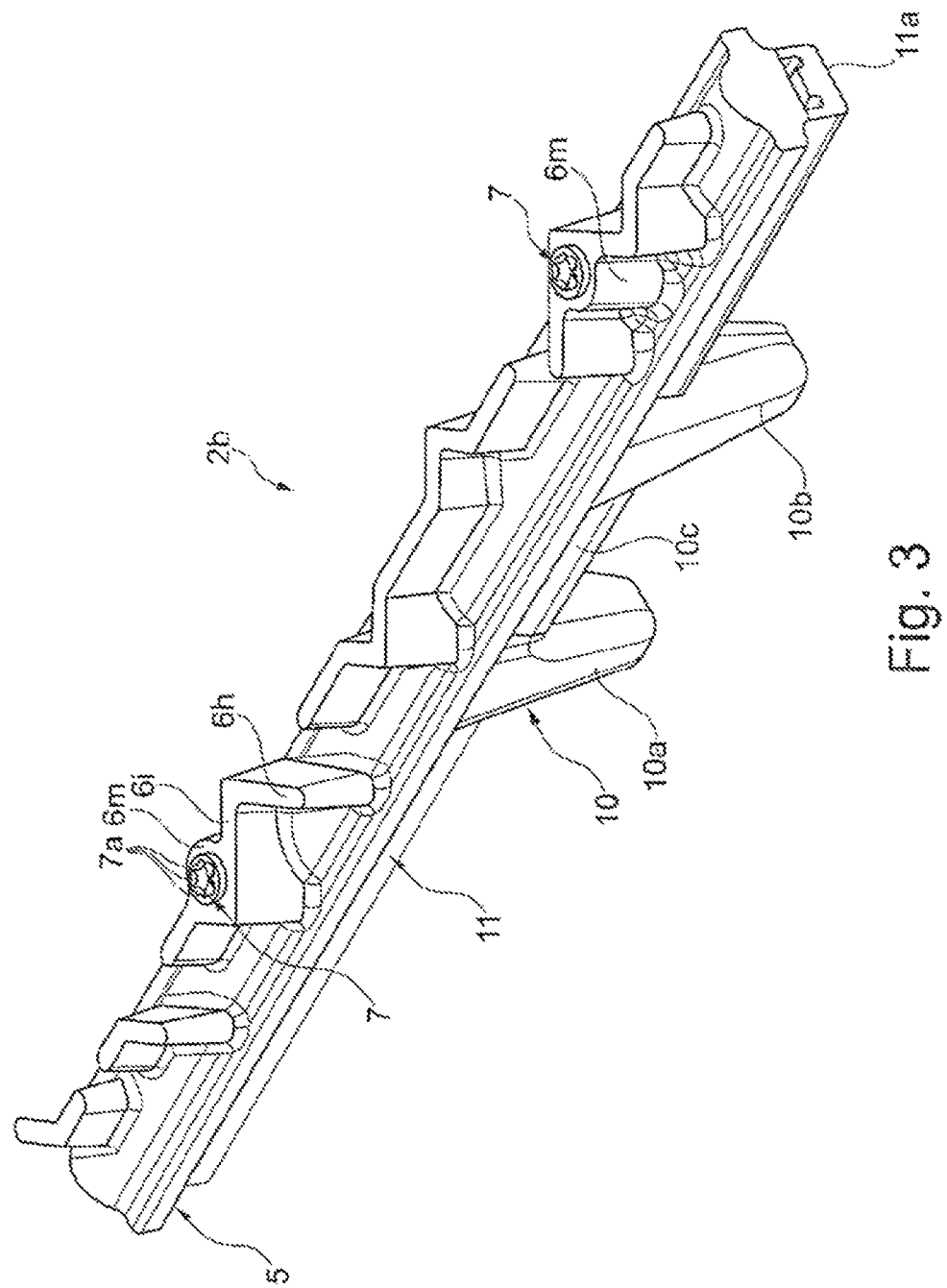
FIG. 3 shows a schematic perspective view of a crawler web according to the invention.

A crawler web 2b according to the invention is shown with further details in FIGS. 2 and 3. It can be seen in FIG. 3 that the crawler web 2b comprises a web rail 11, on the ground contact side of which a tread element 5 is formed and which completely covers the ground contact side of the web rail 11 over the entire length thereof in the longitudinal direction and over the width C thereof.

A track bracket 10 is formed on a chassis side 11a of the web rail 11. The track bracket 10 comprises two separate track humps 10a and 10b which are connected to each other via a central portion 10c of the track bracket. The track humps 10a and 10b protrude here on the chassis side 11a of the web rail 11 and predetermine a guide track on the crawler chain 1 for a chassis (not shown) of a crawler vehicle (not shown). As a result, lateral movements of chassis parts (not shown), such as, for example, a drive wheel and, for example, a chassis roller, can be limited along the crawler webs if the chassis parts, for example, engage between the track humps 10a and 10b and are supported on the central portion 10c.

The tread element 5 and the track bracket 10 are formed here with a continuous material connection, wherein the tread element and the track bracket can be produced, for example, from a single material, in particular by casting, for example injection molding, or by polymerization or by vulcanization.

By means of the in particular integral connection of the tread element 5 to the track bracket 10, forces which are directed sideways and act parallel to the longitudinal axis of the web rail 11 can advantageously be transmitted directly from the track guide elements of the track bracket 10 to the tread element 5 and in particular to the tread cleats 6a-6k. In this manner, for example, displacements of the track bracket 10 and of the tread element 5 with respect to each other and with respect to the web rail 11 that, on previously used crawler webs corresponding to the prior art, may result, as wear progresses, to an increasing movement clearance between track guide elements with the chassis and the tread element 5, can be reduced or even avoided.

In the event of use under wintry conditions at comparatively low temperatures, the properties of the underlying surface, in particular the flexibility thereof, can change comparatively greatly. Therefore, in addition to the profile cleats 6a to 6k, the tread element 5 additionally provides plug-in openings 8, into which bolt-shaped ice spikes 7 made of a hard material, in particular steel, can be plugged. In order to fasten the ice spikes 7 in the plug-in openings 8, metal sleeves 9, into which an ice spike 7 can be, for example, screwed for fastening purposes are embedded on the plug-in openings 8. In the region of the plug-in openings 8, the profile cleats are preferably reinforced by wall portions 6m, as a result of which the metal sleeves 9 and a large part of a surface of an ice spike 7 can be enclosed by a more flexible material of the tread element 5. This affords the advantage that, in the event of ground contact of the crawler rail 2b, an ice spike 7 can be adapted with respect to the position thereof to the underlying surface. Improved engagement of the ice spike 7 in a hard, in particular frozen, underlying surface is thereby possible.

A plurality of teeth 7a are preferably formed on a point of the ice spikes 7, the teeth protruding individually at approximately the same height on the point of the ice spike. This affords the advantage that penetration of an ice spike into an underlying surface can be limited in order to restrict damage to an ecologically sensitive underlying surface.

The web rail 11 is preferably cast into the tread element 5 and into the track bracket 10 in order, by means of corresponding adhesion forces, to avoid wear to the crawler web 2b by means of relative movements of the web rail with respect to the tread element and with respect to the track brackets.

Figure 4:
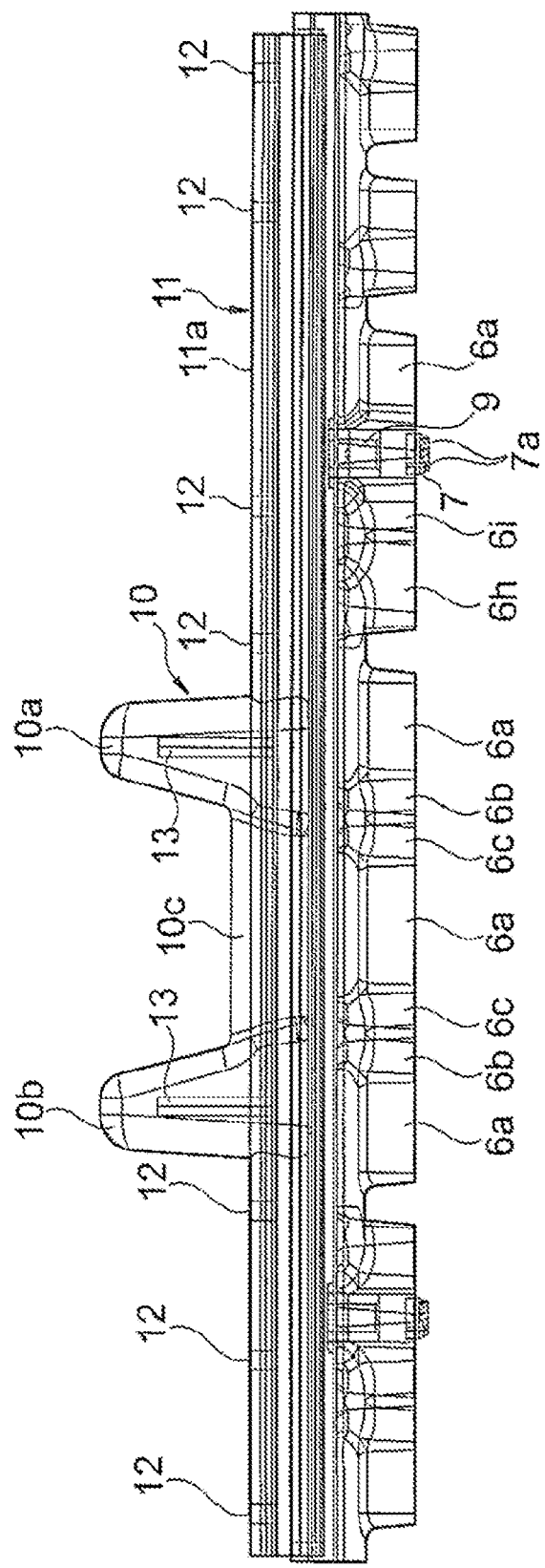
FIG. 4 shows a schematic view of a longitudinal side of the crawler web.

FIG. 4 illustrates the web rail 2b in semi-transparent form, as a result of which even concealed contours can be seen. Clamping pins 13 which are encased by the track humps 10a and 10b of the track bracket 10 are inserted on the upper side 11a of the web rail 11. This results in an improved transmission of transverse forces perpendicularly to the running or driving direction of a crawler vehicle (not shown).

Furthermore, a plurality of bores 12 which are provided for the attaching of track belts 3a, 3b and 3c, for example by screwing the latter on, are formed on the upper side 11a of the web rail 11. A comparatively simple and rapid installation of a crawler chain 1 with the crawler webs 2a, 2b according to the invention is therefore possible.

FIGS. 5a, 5b, 5c and 5d show further details of the crawler web 2a, 2b and in particular of the web rail 11. It can be seen in FIGS. 5b and 5c that the web rail 11 is designed as a substantially rectangular, tubular metal profile rail. The ground contact side 11a and the chassis side 11b are delimited here in the running direction R by the front side 11c and counter to the running direction R by the rear side 11d. On the ground contact side 11b, the cross-sectional profile of the web rail 11 has, on the front side 11c, a web-shaped projection 11e projecting in the running direction R. On the rear side 11d, a further web-shaped projection 11f, which is directed counter to the web-shaped projection 11e, is formed on the ground contact side 11b. The web-shaped projections 11e and 11f on the ground contact side 11b enlarge a supporting surface of the crawler web 2a, 2b and permit a correspondingly enlarged design of the tread element 5, as a result of which, for example, a tendency of a crawler web 2a, 2b to buckle on an uneven underlying surface is reduced.

A material strength of the cross section of the web rail 11 is reinforced in the region of the chassis side 11a. This affords the advantage of a comparatively stable anchoring of the clamping pins 13 in the fastening bores 14 (FIG. 5c) at which the clamping pins 13 can be, for example, knocked in. In addition, correspondingly deep bores 12, for example for internal threads, can be formed on the reinforced chassis side 11a. The depth of the bores 12 provides an increased contact surface for screw connections, with which the track belts 3a to 3c can advantageously be reliably fastened.

Figure 5D:
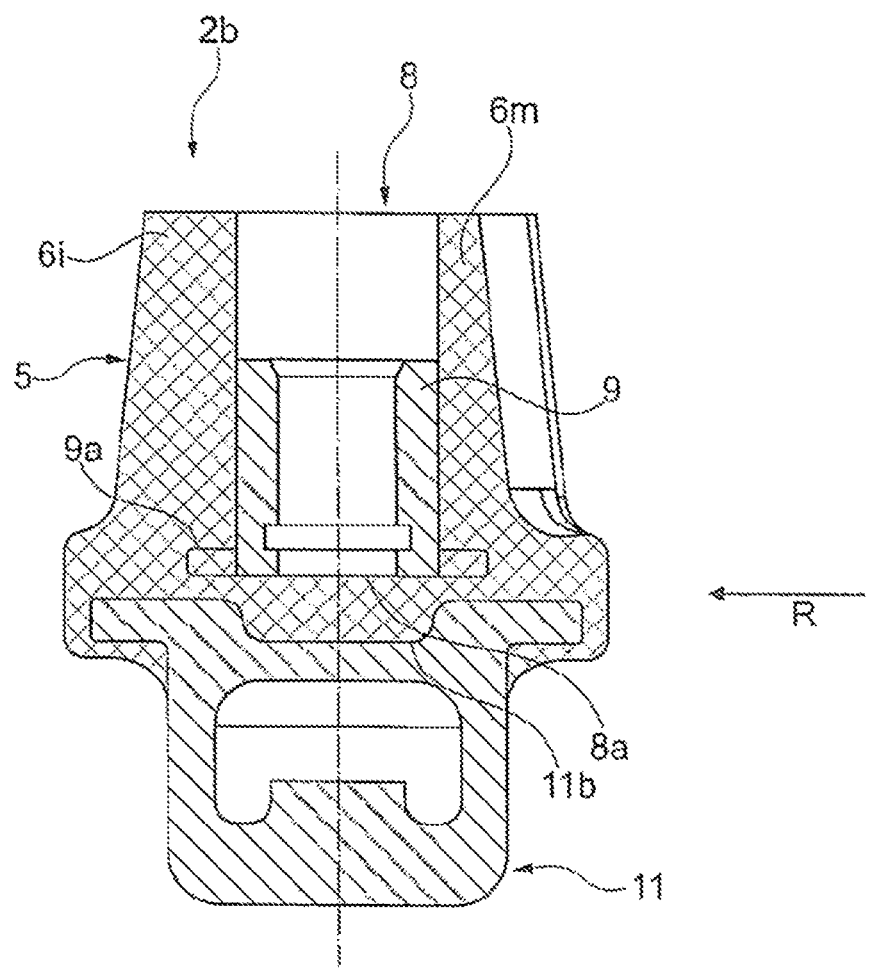
FIG. 5d shows a schematic view of a cross section of the web rail on a sectional plane running centrally through a metal sleeve for an ice spike.

FIG. 5d shows a cross section of the crawler web 2b in the region of one of the depressions 8 in the tread element 5 together with the metal sleeve 9 which is provided for the attachment of the ice spike 7. The depression 8 is formed in the elastic material of the tread element 5 in the region of the tread cleat 6i and of the wall portion 6m. The depression 8 reaches as far as a base 8a, from which the substantially hollow-cylindrical metal sleeve 9 reaches to just above half the height of the depression. The metal sleeve 9 has a raised edge 9a on the base 8a as a result of which an enlarged supporting surface is formed on the metal sleeve in the region of the base 8a. The base 8a is formed here from the elastic material of the tread element 5, with which elastic material the region between the base 8a of the depression 8 and the ground contact side 11b of the web rail 11 is filled. This affords the advantage that the metal sleeve 9 and an ice spike 7 mounted therein are mounted elastically in relation to the web rail 11 by the material of the tread element 5.

LIST OF REFERENCE NUMBERS

1 Crawler chain
2a Crawler web
2b Crawler web with plug-in receptacle, plug-in opening
3a Track belt
3b Track belt
3c Track belt
4 Chain link portion
5 Tread element
6a-6k Tread cleats
6m Wall portion
7 Ice spike
7a Tooth
8 Depression, hole
8a Base
9 Attachment sleeve, metal sleeve, ice spike bushing, steel bushing
9a Raised edge
10 Track bracket
10a Track hump
10b Track hump
10c Central portion
11 Web rail
11a Chassis side
11b Ground contact side
11c Front side
11d Rear side
11e Projection
11f Projection
12 Bore (for attaching a track belt)
13 Clamping pin
14 Bore (for knocking a clamping pin into)

The invention claimed is:

1. A crawler web for a crawler chain of a crawler vehicle comprising: a base rail which is attachable releasably to the crawler chain, a track bracket which is provided for guiding the crawler chain on a chassis of the crawler vehicle, and a tread element which is provided for arrangement on a ground contact side of the crawler chain and for engagement in an underlying surface, wherein the track bracket and the tread element are formed integrally, wherein the tread element is extended over a part of the length in the longitudinal direction of the base rail, and wherein the tread element is delimited on the ground contact side by an at least enveloping profile line which has a downwardly precurved profile along a longitudinal axis of the tread element.

2. The crawler web according to claim 1, wherein the track bracket and the tread element are cast onto the base rail.

3. The crawler web according to claim 1, wherein the track bracket and the tread element are connected to the base rail by vulcanization.

4. The crawler web according to claim 1, further comprising at least two tread profile portions, which protrude outwards, formed on the tread element and arranged in an angled manner with respect to each other and with respect to a longitudinal axis of the tread element.

5. The crawler web according to claim 4, wherein the tread profile portions protrude outward and downward from the tread element, and are arranged in an angled manner with respect to a longitudinal axis of the base rail.

6. The crawler web according to claim 1, further comprising a penetrating element attached to the crawler web.

7. The crawler web according to claim 6, further comprising a plurality of pointy projections arranged separately next to one another and protruding in a common direction from one end of the penetrating element for ground contact.

8. The crawler web according to claim 7, wherein the projections are positioned substantially at the same height.

9. The crawler web according to claim 6, further comprising an attachment sleeve, for attaching the penetrating element to the tread element, cast into the tread element.

10. The crawler web according to claim 9, wherein the attachment sleeve is arranged in the tread element in such a manner that the attachment sleeve is spaced apart from the base rail by an elastically flexible material of the tread element.

11. The crawler web according to claim 9, wherein the attachment sleeve has an internal thread on an outwardly directed opening.

12. The crawler web according to claim 9, wherein the attachment sleeve has a groove of a bayonet catch on an outwardly directed opening.

13. The crawler web according to claim 9, wherein the attachment sleeve is produced from a metal.

14. The crawler web according to claim 6, wherein the penetrating element is an ice spike.

15. The crawler web according to claim 1, further comprising at least one reinforcing element formed on the base rail for at least partially stiffening the track bracket.

16. The crawler web according to claim 1, wherein the base rail is produced from a metal.

17. The crawler web according to claim 1, wherein the base rail further comprises an attachment device for a crawler belt.

\* \* \* \* \*